(12) United States Patent
Ko

(10) Patent No.: US 7,250,125 B2
(45) Date of Patent: Jul. 31, 2007

(54) METHOD OF FABRICATING FOAMED RUBBER MEMBER

(75) Inventor: Semi Ko, Chang-Hua Hsien (TW)

(73) Assignee: Shiun Jiug Industrial Co., Ltd., Chang Hua (TW)

(*) Notice: Subject to any disclaimer, the term of this patent is extended or adjusted under 35 U.S.C. 154(b) by 179 days.

(21) Appl. No.: 11/092,925

(22) Filed: Mar. 30, 2005

(65) Prior Publication Data
US 2006/0220270 A1    Oct. 5, 2006

(51) Int. Cl.
*B29C 44/02* (2006.01)
*B29C 44/12* (2006.01)
*B29C 44/20* (2006.01)

(52) U.S. Cl. .................. 264/46.4; 156/79; 264/54; 264/257

(58) Field of Classification Search ............. 264/46.4, 264/50, 51, 53, 54, 236, 257; 156/79
See application file for complete search history.

(56) References Cited

U.S. PATENT DOCUMENTS

| 2,604,602 A | * | 7/1952 | Hough | 313/597 |
| 3,467,570 A | * | 9/1969 | Gilbert et al. | 428/220 |
| 5,788,332 A | * | 8/1998 | Hettinga | 297/452.55 |
| 5,855,022 A | * | 1/1999 | Storto | 2/161.2 |
| 5,925,306 A | * | 7/1999 | Huang | 264/540 |

* cited by examiner

*Primary Examiner*—Allan R. Kuhns
(74) *Attorney, Agent, or Firm*—Troxell Law Office, PLLC

(57) ABSTRACT

A method of making a foamed rubber member includes the steps of: a) Stirring and pressing the foaming raw material repeatedly, wherein the foaming raw material has rubber, an accelerator, and foaming agent mixed in a predetermined ratio. b) Molding the foaming raw material into a meshed rubber sheet. c) Softening a surface of the meshed rubber sheet. d) Resting an attachment on the surface of the meshed rubber sheet and pressing the attachment. e) Vulcanizing and foaming the meshed rubber sheet to have a foaming member.

6 Claims, 2 Drawing Sheets

METHOD OF FABRICATING FOAMED RUBBER MEMBER

BACKGROUND OF THE INVENTION

1. Field of the Invention

The present invention relates generally to a foamed-rubber member, and more particularly to a method of fabricating foamed rubber members.

2. Description of the Related Art

For the objectives of increasing ventilation, reducing weight, and lowering the cost of fabrication, some foamed rubber cushions are made into meshed members, such as the skidproof cushion used at home or in car. Conventional methods of making the meshed foamed rubber cushion include: 1) A meshed member woven by yarns is soaked with a rubber foaming raw material. The material is cohered on the meshed member for foaming. 2) Use mold or cutter to make the rubber cushion into a meshed member.

The conventional methods still have drawbacks. First, the conventional methods cannot make the meshed cushion in a single process. Second, the first conventional has a poor flexibility because of the yarns. Third, the pure meshed foamed rubber products cannot reach the requirement of product variety in the present market. A new product is presented by attaching a fabric on the meshed foamed rubber member.

A conventional method of attaching a fabric on a meshed foamed rubber member is to coat glue on a rubber sheet before the foaming process. The chemical reactions of the foaming process press the fabric on the foamed rubber member. But the glue produces air or water pollutions.

SUMMARY OF THE INVENTION

The primary objective of the present invention is to provide a method of fabricating a foamed rubber member, which has a meshed rubber member attached with a member with a different material property and no glue is involved in the attachment.

According to the objective of the present invention, a method of making a foamed rubber member comprises the steps of:

a) Stirring and pressing the foaming raw material repeatedly, wherein the foaming raw material has rubber, an accelerator, and foaming agent mixed in a predetermined ratio.

b) Molding the foaming raw material into a meshed rubber sheet.

c) Softening a surface of the meshed rubber sheet.

d) Resting an attachment on the surface of the meshed rubber sheet and pressing the attachment.

e) Vulcanizing and foaming the meshed rubber sheet to have a foaming member.

DETAILED DESCRIPTION OF THE INVENTION

Figure 1:
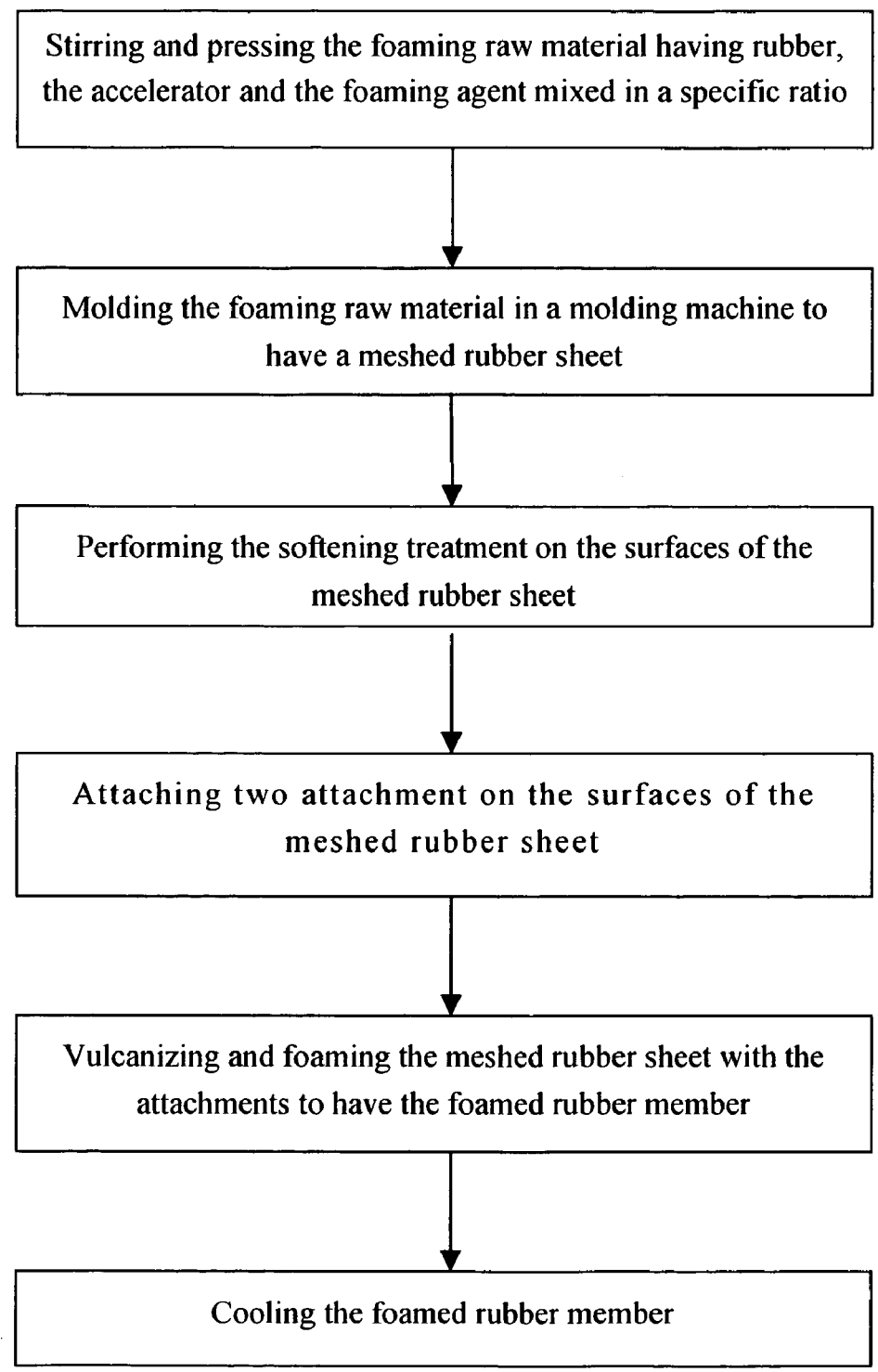
FIG. 1 is a flow chart of a preferred embodiment of the present invention.
Figure 2:
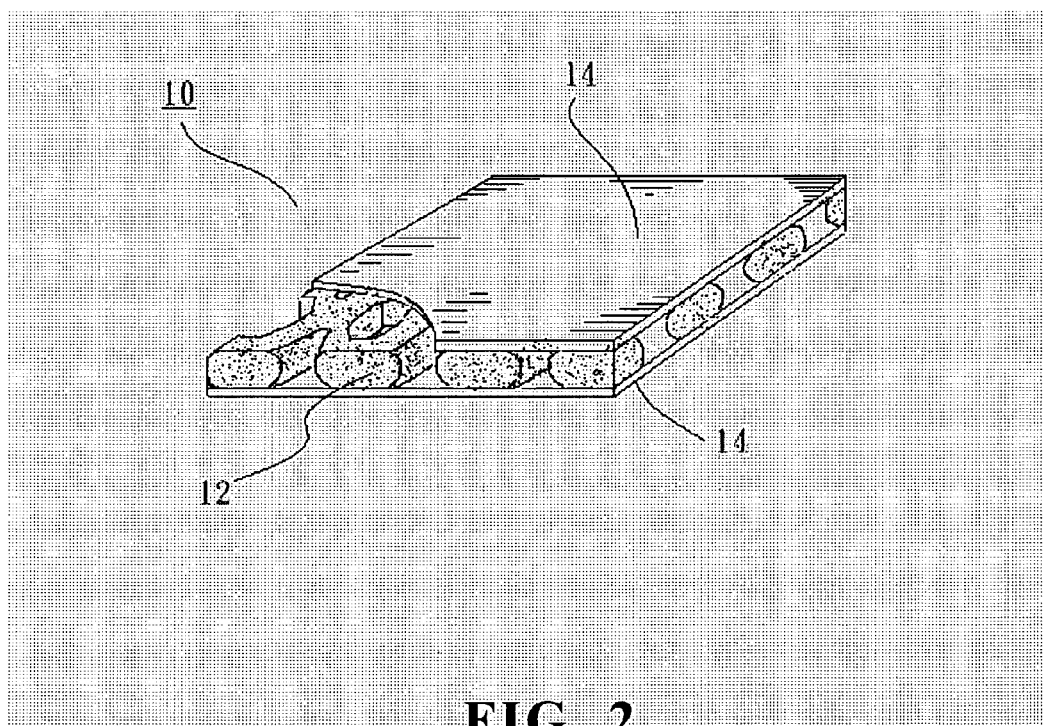
FIG. 2 is a perspective view of the foamed member made by the method of the preferred embodiment of the present invention.

As shown in FIG. 1 and FIG. 2, a method of the first preferred embodiment of the present invention to fabricate a foamed rubber member comprises the steps of:

The first step of the embodiment is to prepare a foamable raw material that has a predetermined ratio of rubber, and an accelerator etc. The foamable raw material is put in a machine to stir and press it repeatedly, and then send the foamable raw material to a conventional mixing machine for modification of well mixing.

The foamable raw material has natural rubber and synthesis elastic material (e.g. Styrene Butadiene Rubber (SBR), Polybutadiene Rubber (BR) and Ethylene Propylene Terpolymer Rubber (EPDM)) in a ratio of 4:1 and a curing agent (sulfur), a foaming agent (Azodicarbonamide (ADGA), an accelerator (tetramethyl thiuram disulfide (TMTD) and 2-Mercaptobenzothiazole (MBT)) and a filler (or a reinforced agent) and an additive (rubber grade carbon black, fumed silica, $CaCO_3$ and $CaSiO_3$) to lower the cost and to improve the material properties of the rubber product.

The second step of the embodiment is to put the foamable raw material in a molding machine (not shown) to mold the foamable raw material to a meshed rubber sheet 12. The molding machine is a conventional flat net extrusion machine well known in the plastic industry.

The third step is to perform a softening treatment on surfaces of the meshed rubber sheet 12. The softening treatment is to coat a surface softening agent on the surface of the meshed rubber sheet 12, and then heat it between 150° C. and 250° C. to soften the surface of the meshed rubber sheet 12. The surface softening agent can utilize the conventional rubber softening agents in the process of rubber products.

The fourth step is to rest two attachments 14 on opposite sides of the meshed rubber sheet 12, and press them to bond them on the meshed rubber sheet 12. The attachments 14 may be elastic fabrics.

The fifth step is to put the meshed rubber sheet 12 with the attachments 14 in a die for vulcanization and foaming. The meshed rubber sheet 12 is foamed therein, and the pressure generated from the chemical reactions of the foaming makes a foamed rubber member 10.

The last step of the embodiment is to cool the foamed rubber member 10 in room temperature.

The attachment 14 may be a plastic film also that makes the foamed rubber member 10 of the present invention has various properties to be broadly incorporated in the relative products.

The present invention uses the force in the period of the rubber raw material foaming and the gas pressure generated from the chemical reactions of the foaming agent to attach the attachments 14 with different physical property on the meshed rubber sheet 12. No glue is involved in the method of the present invention. There is no cutting mesh pores step in the present invention also that lowers the cost. The foamed rubber member 10 of the present invention has a well elasticity.

In conclusion, the method of the present invention can make the foamed rubber member consisted of the meshed rubber member and the attachments with different physical properties. No glue is involved to bond the attachments that produce no air or water pollution.

What is claimed is:

1. A method of making a foamed rubber member, comprising the steps of:
   a) stirring and pressing a foamable raw material repeatedly, wherein the foamable raw material has rubber, an accelerator, and foaming agent mixed in a predetermined ratio;
   b) molding the foamable raw material into a meshed rubber sheet;
   c) softening a surface of the meshed rubber sheet;
   d) resting an attachment on the surface of the meshed rubber sheet and pressing the attachment; and
   e) vulcanizing and foaming the meshed rubber sheet to have a foamed member.

2. The method as defined in claim 1, wherein in the stirring and pressing step a) the foaming agent is an organic foaming agent.

3. The method as defined in claim 1, wherein the softening step c) includes coating a surface softening agent on the surface of the meshed rubber sheet.

4. The method as defined in claim 1, wherein the softening step c) includes heating the surface of the meshed rubber sheet to a temperature between 150° C. and 250° C.

5. The method as defined in claim 1, wherein in the resting step d) the attachment is an elastic fabric.

6. The method as defined in claim 1, wherein the molding step b) is performed by putting the foamable raw material in a conventional flat sheet net extrusion machine to mold the foamable raw material into the meshed rubber sheet.

* * * * *